United States Patent
Luetzow

[11] Patent Number: 6,137,288
[45] Date of Patent: Oct. 24, 2000

[54] MAGNETIC ROTATIONAL POSITION SENSOR

[76] Inventor: Robert Herman Luetzow, 1327 Grayston Ave., Huntington, Ind. 46750

[21] Appl. No.: 09/074,946

[22] Filed: May 8, 1998

[51] Int. Cl.[7] .................................................. G01B 7/30
[52] U.S. Cl. ............................ 324/207.2; 324/207.21; 324/207.22; 338/324
[58] Field of Search ............................ 324/207.2, 208, 324/207.25, 207.26, 207.24, 252, 251, 207.22, 207.21; 338/32

[56] References Cited

U.S. PATENT DOCUMENTS

| | | | |
|---|---|---|---|
| 4,810,965 | 3/1989 | Fujiwara et al. | 324/208 |
| 5,332,965 | 7/1994 | Wolf et al. | 324/207.12 |
| 5,444,369 | 8/1995 | Luetzow | 324/207.2 |
| 5,460,035 | 10/1995 | Pfaffenberger | 73/118.1 |
| 5,497,081 | 3/1996 | Wolf et al. | 324/207.12 |
| 5,504,427 | 4/1996 | Cooper et al. | 324/207.17 |
| 5,506,502 | 4/1996 | Maennle | 324/207.25 |
| 5,512,820 | 4/1996 | Alfors | 324/207.22 |
| 5,521,495 | 5/1996 | Takahashi et al. | 324/207.18 |
| 5,544,000 | 8/1996 | Suzuki et al. | 361/139 |
| 5,572,120 | 11/1996 | Takaishi et al. | 324/207.21 |
| 5,578,962 | 11/1996 | Rastegar | 330/9 |
| 5,600,238 | 2/1997 | Holloway et al. | 324/207.21 |
| 5,602,471 | 2/1997 | Muth et al. | 324/207.21 |
| 5,611,548 | 3/1997 | Dahlhaus | 277/152 |
| 5,621,179 | 4/1997 | Alexander | 73/862.331 |
| 5,625,239 | 4/1997 | Persson et al. | 310/68 |
| 5,625,289 | 4/1997 | Daetz et al. | 324/207.14 |
| 5,627,465 | 5/1997 | Alfors et al. | 324/207.2 |
| 5,698,778 | 12/1997 | Ban et al. | 73/118.1 |
| 5,712,561 | 1/1998 | McCurley et al. | 324/207.2 |

*Primary Examiner*—Christine K. Oda
*Assistant Examiner*—Anthony Jolly
*Attorney, Agent, or Firm*—Woodard, Emhardt, Naughton, Moriarty & McNett

[57] ABSTRACT

A magnetic rotational position sensor senses each rotational position of a control shaft about a first rotational axis over a definable range of rotation of the control shaft. The magnetic rotational position sensor includes a magnetic circuit, a magnetic flux sensor, a drive circuit, and an output signal amplifier. The magnetic circuit encloses an equally balanced magnetic field, and is adjoined to the control shaft to synchronously rotate the magnetic field about a second rotational axis. The magnetic flux sensor is disposed within the magnetic field to sense each rotational position of the control shaft as the control shaft is rotated about the first rotational axis over the definable range of rotation. The drive circuit is operable to generate a constant current drive signal and a constant voltage drive signal. In response to a generated constant current drive signal and a generated constant voltage drive signal, the magnetic flux sensor generates two voltage sensing signals representative of a sensing of each rotational position of the control shaft about the first rotational axis over the definable range of rotation. In response to a generation of the voltage sensing signals, the output signal amplifier is operable to generate a voltage output signal that is also representative of a sensing of each rotational position of the control shaft about the first rotational axis over the definable range of rotation. The generated voltage output signal can be processed by a microprocessor based system to control all rotational movements of the control shaft about the first rotational axis.

51 Claims, 14 Drawing Sheets

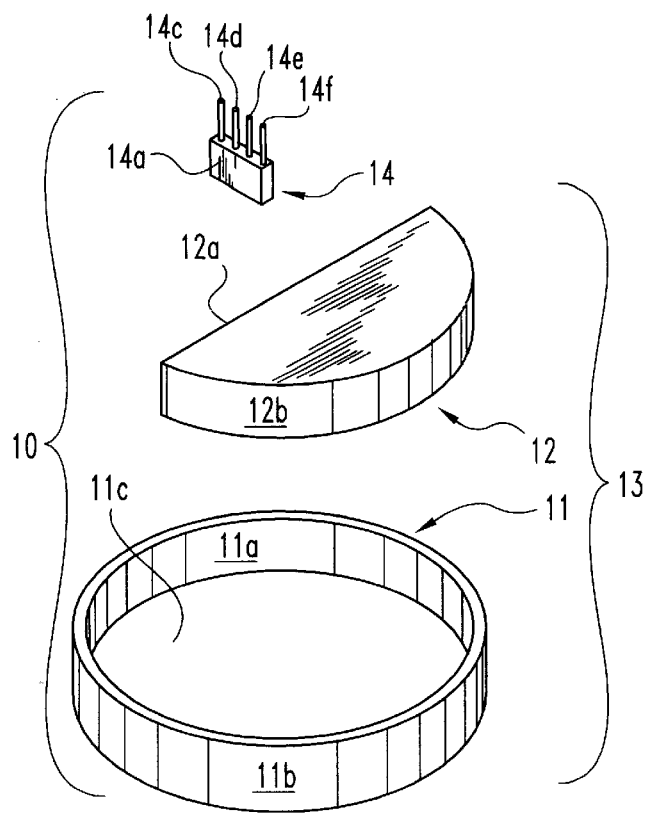
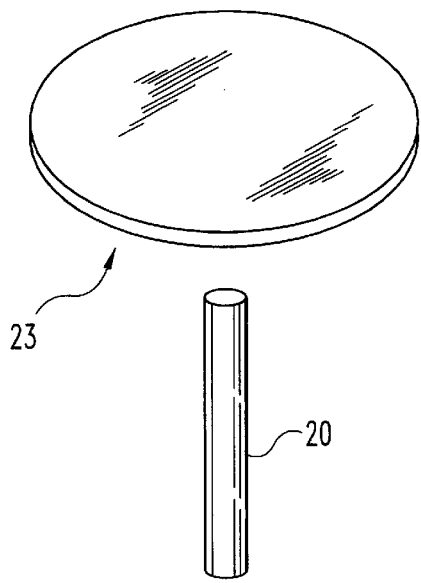
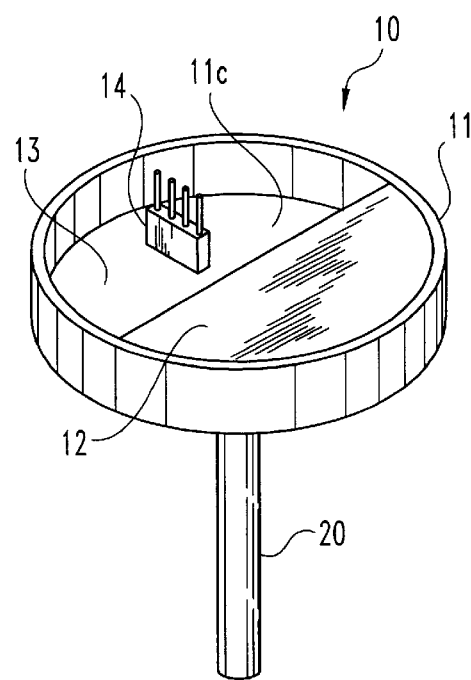
Fig. 1A  Fig. 1B

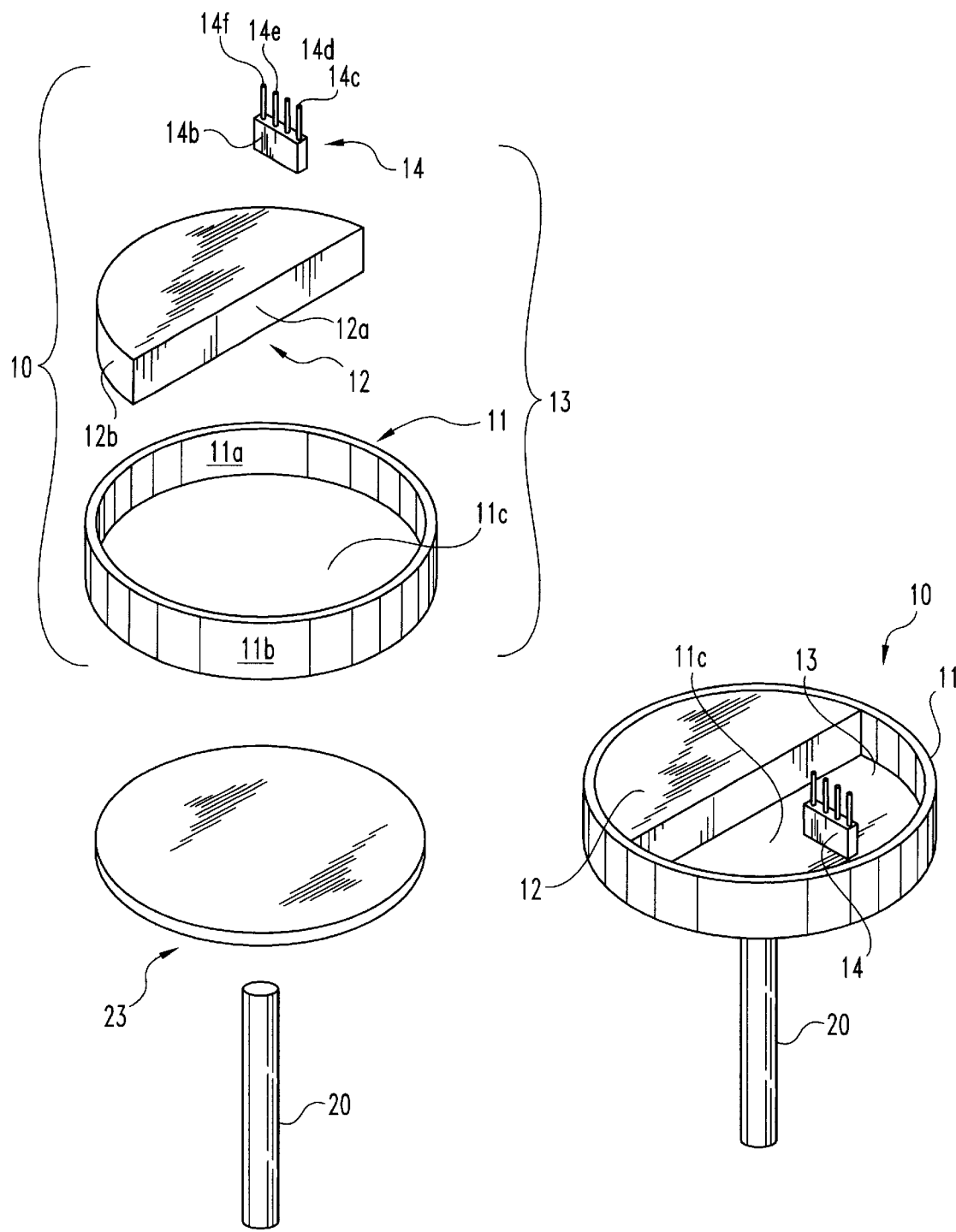
*Fig. 1C*　　　*Fig. 1D*

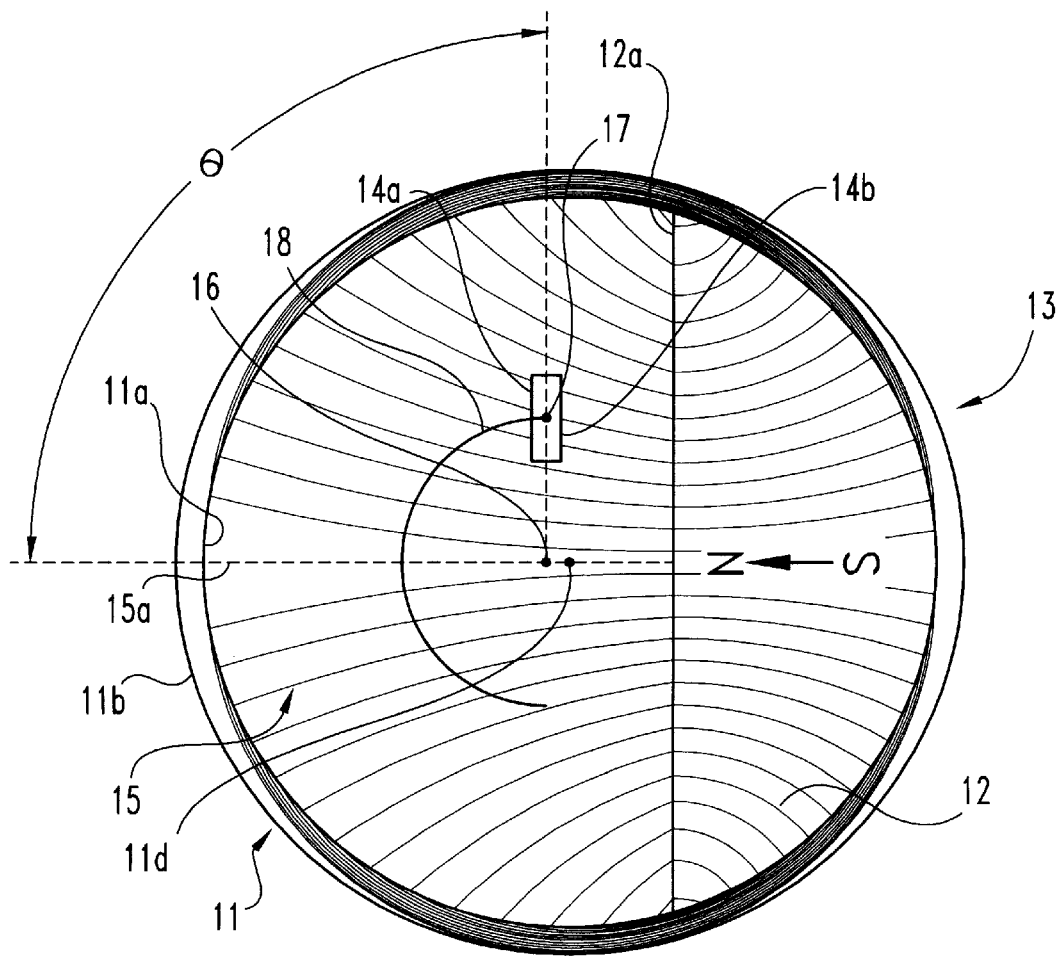
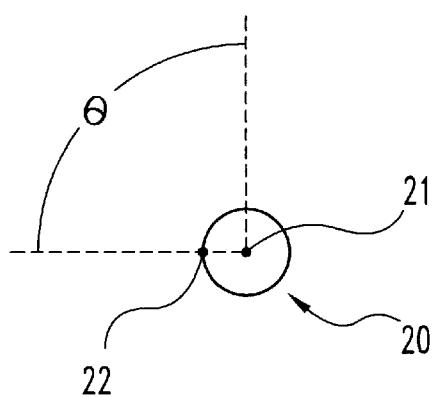
Fig. 2C

MAGNETIC ROTATIONAL POSITION SENSOR

BACKGROUND OF THE INVENTION

The present invention generally relates to the field of rotational position sensors, and more specifically to a magnetic rotational position sensor for sensing each rotational position of a control shaft about a rotational axis over a definable range of rotation.

Electronic fuel injected engines used in motor vehicles typically embody a microprocessor based control system. Fuel is metered or injector activation time is varied in accordance with various engine parameters including the regulation of air flow into the engine via a rotational position of a throttle diaphragm relative to a closed position of the throttle diaphragm. Typically, a shaft is adjoined to the throttle diaphragm to synchronously rotate the throttle diaphragm as the shaft is rotated between the closed position and a maximal open position of the throttle diaphragm. Rotational position sensors are adjoined to the shaft to sense each rotational position of the shaft, i.e. each degree of rotation of the shaft relative to the closed position, thereby the rotational position of the throttle diaphragm relative to the closed position is sensed.

One of the problems associated with the prior magnetic rotational position sensors is magnetic hysteresis. Magnetic hysteresis causes an offset error signal to be generated whenever a magnetic element of the sensor, e.g. a magnetic pole piece or a magnetic rotor, is advanced from and returned to a reference position of the magnetic element. Annealing the magnetic element can minimize, but never eliminate, magnetic hysteresis. What is therefore needed is a novel and unique magnetic rotational position sensor that does not experience magnetic hysteresis.

SUMMARY OF THE INVENTION

The present invention overcomes the aforementioned drawback associated with prior magnetic rotational position sensors. Various aspects of the present invention are novel, non-obvious, and provide various advantages. While the actual nature of the present invention described in detail herein can only be determined with reference to the claims appended hereto, certain features which are characteristic of the present invention disclosed herein can be described briefly.

In accordance with a first aspect of the present invention, a magnetic rotational position sensor senses each degree of rotation of a control shaft about a first rotational axis over a definable range of rotation. The magnetic rotational position sensor comprises a loop pole piece and a magnet. The loop pole piece has an inner diameter surface defining an air gap area, and the magnet is disposed in the air gap area. The magnet has a first pole surface facing and spaced from the inner diameter surface of the loop pole piece and a second pole surface facing the inner diameter surface to generate a magnetic field within the air gap area, and to enclose the magnetic field within the loop pole piece. The loop pole piece is adjoined to the control shaft to synchronously rotate the magnetic field about a second rotational axis for each degree of rotation of the control shaft about the first rotational axis, thus each degree of rotation of the control shaft about the first rotational axis exclusively corresponds to a distinct degree of synchronized rotation of the magnetic field about the second rotational axis. The magnetic rotational position sensor further comprises a magnetic flux sensor operable to sense a magnitude of magnetic flux density passing through the magnetic flux sensor. The magnetic flux sensor is disposed within the magnetic field to sense a different magnitude of magnetic flux density passing through the magnetic flux sensor for each degree of synchronous rotation of the magnetic field over the definable range of rotation.

In accordance with a second aspect of the present invention, a magnetic rotational position sensor generates at least one voltage sensing signal representative of a sensing of each degree of rotation of a control shaft about a first rotational axis over a definable range of rotation. The magnetic rotational position sensor comprises a magnetic circuit. The magnetic circuit generates and encloses a magnetic field, and is adjoined to the control shaft to synchronously rotate the magnetic field about a second rotational axis for each degree of rotation of the control shaft about the first rotational axis, thus each degree of rotation of the control shaft about the first rotational axis exclusively corresponds to a distinct degree of synchronized rotation of the magnetic field about the second rotational axis. The magnetic rotational position sensor further comprises a drive circuit, and a magnetic flux sensor electrically coupled to the drive circuit. The drive circuit includes means for generating and controlling a constant current drive signal and a constant voltage drive signal. The magnetic flux sensor is operable to generate a first voltage sensing signal representative of a sensing of a magnitude of magnetic flux density passing through the magnetic flux sensor in response to a generated constant current drive signal and a generated constant voltage drive signal. The magnetic flux sensor is disposed within the magnetic field to sense a different magnitude of magnetic flux density passing through the magnetic flux sensor for each degree of synchronous rotation of the magnetic field over the definable range of rotation, thus a generated first voltage sensing signal is also representative of each degree of rotation of the control shaft about the first rotational axis over the definable range of rotation.

In accordance with a third aspect of the present invention, a magnetic rotational position sensor generates a voltage output signal representative of a sensing of each degree of rotation of a control shaft about a first rotational over a definable range of rotation. The magnetic rotational position sensor comprises a magnet circuit. The magnetic circuit generates and encloses a magnetic field, and is adjoined to the control shaft to synchronously rotate the magnetic field about a second rotational axis for each degree of rotation of the control shaft about the first rotational axis, thus each degree of rotation of the control shaft about the first rotational axis exclusively corresponds to a distinct degree of synchronized rotation of the magnetic field about the second rotational axis. The magnetic rotational position sensor further comprises a drive circuit, a magnetic flux sensor electrically coupled to the drive circuit, and an output signal amplifier electrically coupled to the magnetic flux sensor. The drive circuit is operable to generate a constant current drive signal and a constant voltage drive signal. In response to a generated constant current drive signal and a constant voltage drive signal, the magnetic flux sensor generates a first voltage sensing signal representative of a sensing of a magnitude of magnetic flux density passing through a first plane of the magnetic flux sensor and generates a second voltage sensing signal representative of a sensing of a magnitude of magnetic flux density passing through a second plane of the magnetic flux sensor. The magnetic flux sensor is disposed within the magnetic field to sense a different magnitude of magnetic flux density passing the first plane and the second plane of the magnetic flux sensor for each degree of synchronous rotation of the magnetic field over the definable range of rotation, thus a generated first voltage sensing signal and a generated second voltage sensing signal are also representative of a sensing of each degree of rotation of the control shaft about the first rotational axis over the definable range of rotation. The output signal amplifier is operable to generate the voltage output signal in response to a generation of the first voltage sensing signal and a generation of the second voltage sensing signal. The output signal amplifier includes means for counteracting any temperature sensitivity drift of the generated first voltage sensing signal and any temperature sensitivity drift of the generated second voltage sensing signal.

It is a first object of the present invention to sense each rotational position of a control shaft about a rotational axis over a definable range of rotation without experiencing magnetic hysteresis.

It is a second object of the present invention to linearly sense each rotational position of a control shaft about a rotational axis over a significant scope of a definable range of rotation without experiencing magnetic hysteresis.

It is a third object of the present invention to generate one or more voltage sensing signals representative of a sensing of each rotational position of a control shaft about a rotational axis over a definable range of rotation without experiencing magnetic hysteresis.

It is a fourth object of the present invention to linearly generate one or more voltage sensing signals representative of a sensing of each rotational position of a control shaft about a rotational axis over a significant scope of a definable range of rotation without experiencing magnetic hysteresis.

It is a fifth object of the present invention to generate a voltage output signal representative of a sensing of each rotational position of a control shaft about a rotational axis over a definable range of rotation without experiencing magnetic hysteresis.

It is a sixth object of the present invention to linearly generate a voltage output signal representative of a sensing of each rotational position of a control shaft about a rotational axis over a significant scope of a definable range of rotation without experiencing magnetic hysteresis.

These and advantages of the present invention will become more apparent from the following description of the preferred embodiment.

BRIEF DESCRIPTION OF THE DRAWINGS

FIG. 1A is a first exploded view of a first embodiment of a magnetic rotational position sensor in accordance with the present invention.

FIG. 1B is a first perspective view of the magnetic rotational position sensor of FIG. 1A as assembled and adjoined to a control shaft.

FIG. 1C is a second exploded view of the magnetic rotational position sensor of FIG. 1A.

FIG. 1D is a second perspective view of the magnetic rotational position sensor of FIG. 1A as assembled and adjoined to a control shaft.

FIG. 2C is a third diagrammatic illustration of the magnetic circuit of FIGS. 1A–1D.

DESCRIPTION OF THE PREFERRED EMBODIMENT

Figure 2A:
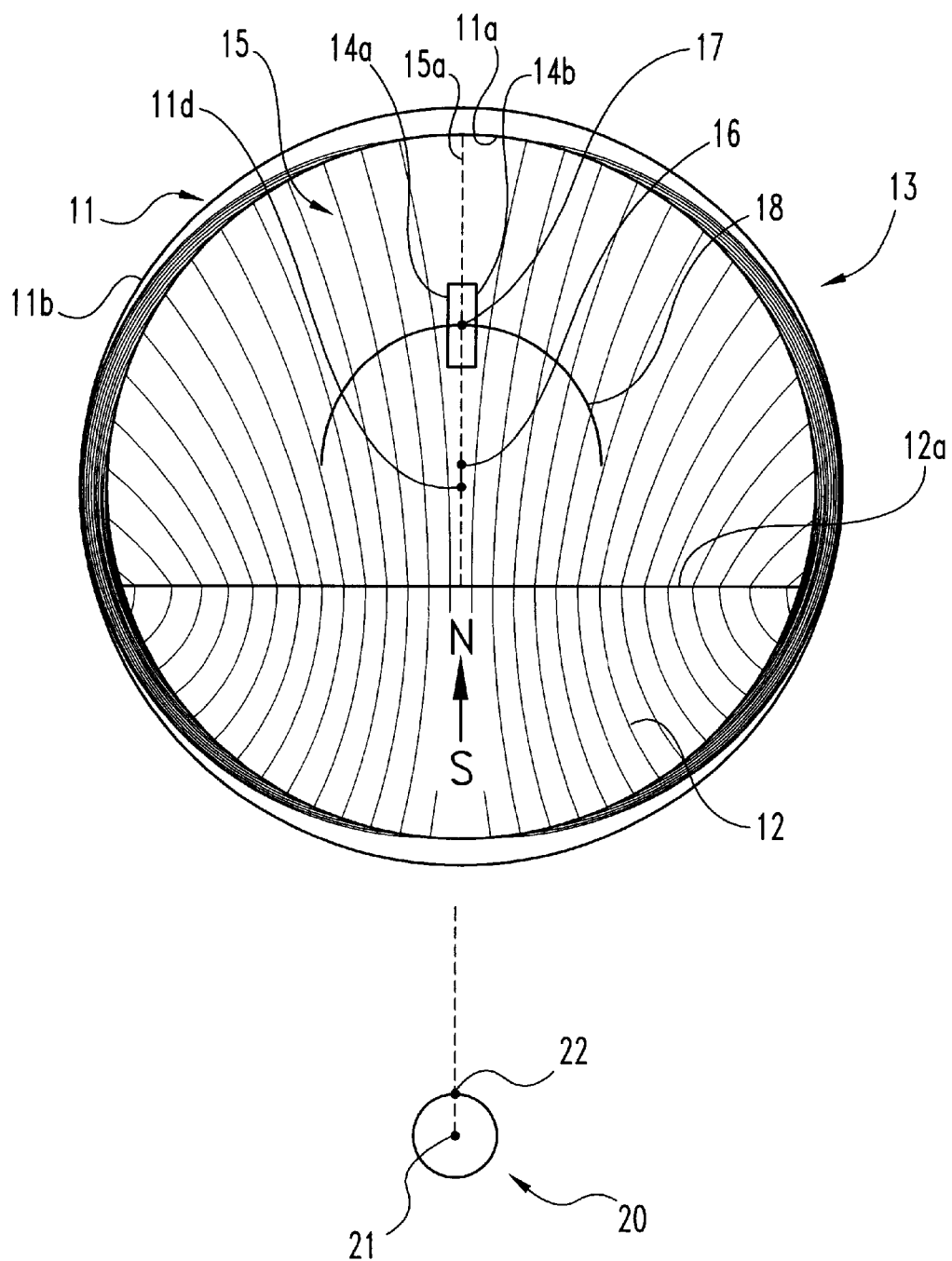
FIG. 2A is a first diagrammatic illustration of a magnetic circuit of FIGS. 1A–1D.

For the purposes of promoting an understanding of the principles of the present invention, reference will now be made to the preferred embodiment illustrated in the drawings and specific language will be used to describe the same. It will nevertheless be understood that no limitation of the scope of the present invention is thereby intended, such alterations and further modifications in the illustrated embodiments and such further applications of the principles of the present invention as illustrated therein being contemplated as would normally occur to one skilled in the art to which the present invention relates.

The present invention is a novel and unique magnetic rotational position sensor that senses each degree of rotation of a control shaft about a rotational axis over a definable range of rotation without experiencing magnetic hysteresis. For purposes of the present invention, a control shaft is broadly defined as any article of manufacture or any combination of manufactured articles that is adjoined to an object, e.g. a throttle diaphragm, a foot pedal, a piston, etc., to control the linear, angular and/or rotational movement of the object as the control shaft is rotated about a rotational axis, e.g. a longitudinal axis of the control shaft. Referring to FIGS. 1A–1D, a first embodiment of a magnetic rotational position sensor 10 in accordance with the present invention is shown. Magnetic rotational position sensor 10 senses each degree of rotation of a control shaft 20 about a rotational axis over a 180 degree range of rotation without experiencing magnetic hysteresis as further described in FIGS. 2A–2C and accompanying text.

Magnetic rotational position sensor 10 comprises a loop pole piece. For purposes of the present invention, a loop pole piece is broadly defined as any magnetizable article of manufacture or any combination of manufactured magnetizable articles that has a closed configuration defining an air gap area. The present invention contemplates that the loop pole piece can vary in geometric size and shape, and can be made from any magnetizable material. Preferably, the loop pole piece is a soft magnetic steel loop pole piece 11 having an annular inner diameter surface 11a defining an air gap area 11c and an annular outer diameter surface 11b as shown in FIGS. 1A–1D. It is also preferred that loop pole piece 11 has a thickness of 0.1 inches, inner diameter surface 11a has a radius of 0.7 inches, and outer diameter surface 11b has a radius of 0.75 inches.

Magnetic rotational position sensor 10 further comprises a magnet disposed within air gap area 11c to constitute a magnetic circuit that generates a magnetic field within air gap area 11c and encloses the magnetic field within loop pole piece 11 to prevent magnetic hysteresis. Accordingly, the present invention contemplates that either a north pole surface of the magnet is facing and spaced from inner diameter surface 11a and a south pole surface of the magnet is facing and adjacent inner diameter surface 11a, or a north pole surface of the magnet is facing and adjacent inner diameter surface 11a and a south pole surface of the magnet is facing and spaced from inner diameter surface 11a, or a north pole surface and a south pole surface of the magnet are both facing and spaced from inner diameter surface 11a. The present invention further contemplates that the magnet can vary in geometric size and shape, and can be any type of magnet. Preferably, the magnet is an injection molded rare earth magnet 12 having a substantially semi-circular configuration that is void of any magnetic flux density "hot spots" along both pole surfaces. Magnet 12 is disposed within air gap area 11c to constitute a magnetic circuit 13 as shown in FIGS. 1B and 1D. Magnet 12 has a north pole surface 12a facing and spaced from inner diameter surface 11a and a south pole surface 12b facing and adjoined to inner diameter surface 11a to generate an equally balanced magnetic field 15 throughout air gap area 11c and to enclose magnetic field 15 within loop pole piece 11 as further described in FIGS. 2A–2C and accompanying text. It is also preferred that magnet 12 has a thickness of 0.1 inches, and a maximum radial length of south pole surface 12b is 0.25 inches. troop pole piece 11 is adjoined to control shaft 20 to synchronously rotate magnetic field 15 about a second rotational axis for each degree of rotation of control shaft 20 about a first rotational axis, e.g. longitudinal axis 21 of control shaft 20, as further described in FIGS. 2A–2C and accompanying text. For purposes of the present invention, the term adjoined is broadly defined as an unitary fabrication, a permanent affixation, a detachable coupling, a continuous engagement or a contiguous disposal by any means of a first article and a second article, e.g. south pole surface 12b and inner diameter surface 11a, and loop pole piece 11 and control shaft 20. Preferably, loop pole piece 11, magnet 12 and control shaft 20 are encapsulated in plastic to permanently affix south pole surface 12a and inner diameter surface 11a via a plastic bonding, and to permanently affix loop pole piece 11 and control shaft 20 via a plastic base 23 as shown in FIGS. 1A–1D.

Magnetic rotational position sensor 10 further comprises a magnetic flux sensor. For purposes of the present invention, a magnetic flux sensor is broadly defined as any device operable to sense a magnitude of a magnetic flux density passing through the device and operable to generate at least one voltage sensing signal representative of a magnitude of magnetic flux density passing through the device. Preferably, the magnetic flux sensor is a Hall effect device 14, e.g. a HZ-302C(SIP type) Hall effect device manufactured by Ashai Kasei Electronics Co., Ltd., as shown in FIGS. 1A–1D. Hall effect device 14 has a first plane 14a and a second plane 14b, and is operable to sense a magnitude of magnetic flux density passing through planes 14a and 14b. Hall effect device includes an input lead 14c, a reference lead 14d, a first output lead 14e and a second output lead 14f. In response to a current drive signal $I_{DS}$ and a voltage drive signal $V_{DS}$, Hall effect device 14 is also operable to generate a first voltage sensing signal $V_{SS1}$, and a second voltage sensing signal $V_{SS2}$. Both voltage sensing signals $V_{SS1}$ and $V_{SS2}$ are representative of a magnitude of magnetic flux density passing through planes 14a and 14b, respectively, as further described in FIGS. 4A and 4B, and accompanying text.

Figure 2B:
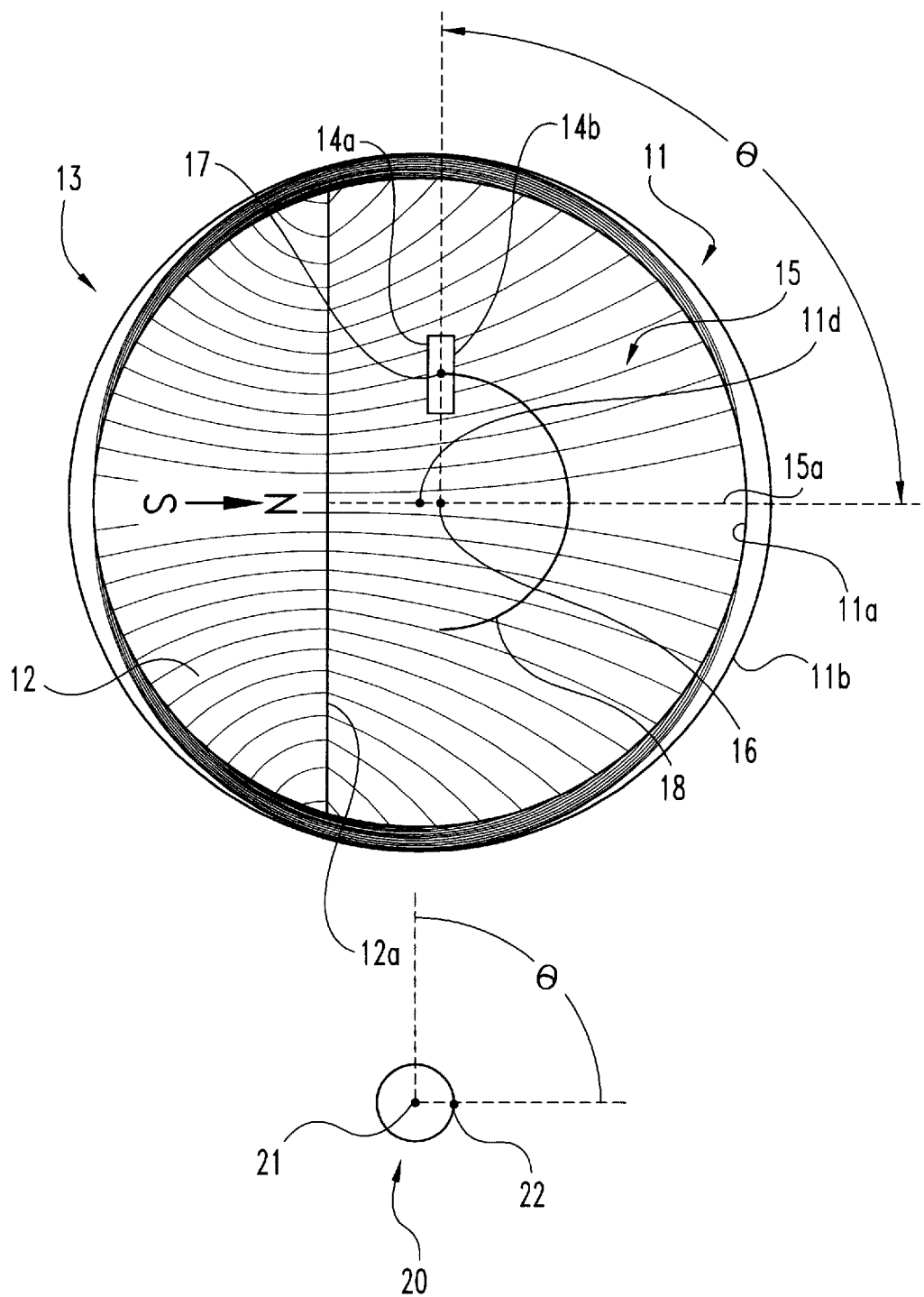
FIG. 2B is a second diagrammatic illustration of the magnetic circuit of FIGS. 1A–1D.

Referring to FIGS. 2A–2C, to sense each degree of rotation of control shaft 20 about a rotational axis, e.g. a longitudinal axis 21 of control shaft 20, over a definable range of rotation, a different magnitude of magnetic flux density must pass through planes 14a and 14b of magnetic flux sensor 14 for each degree of synchronized rotation of magnetic field 15 about a second rotational axis, e.g. a rotational axis 16, over the definable range of rotation. Consequently, an angular orientation angle θ of planes 14a and 14b relative to magnetic field 15 must change for each degree of synchronized rotation of magnetic field 15 about rotational axis 16 over the definable range of rotation. Preferably, when magnetic flux sensor 14 is disposed along a center line 15a of magnetic field 15, planes 14a and 14b are parallel to magnetic field 15, i.e. an angular orientation angle θ of zero degrees, as shown in FIG. 2A. It is to be appreciated and understood that angular orientation angle θ relative to magnetic field 15 will change with each degree of synchronized rotation of magnetic field 15 about rotational axis 16 over a ±ninety (90) degree range of synchronized rotation of magnetic field 15 relative to magnetic flux sensor 14 as evidenced by the synchronized rotational movement of a center point 17 of magnetic flux sensor 14 and a reference point 22 of control shaft 20 as shown in FIGS. 2B and 2C. Thus, it is to be appreciated and understood that each degree of rotation of control shaft 20 about longitudinal axis 21 over a 180 degree range of rotation can be sensed because each degree of rotation of control shaft 20 about longitudinal axis 21 exclusively corresponds to a distinct degree of synchronized rotation of magnetic field 15 about rotational axis 16 and a different magnitude of magnetic flux density will pass through magnetic flux sensor 14 for each degree of synchronized rotation of magnetic field 15 about rotational axis 16 over the 180 degree range of rotation.

To linearly sense each degree of rotation of control shaft 20 about longitudinal axis 21 over the 180 degree range of rotation, angular orientation angle θ must uniformly change for each degree of synchronized rotation of magnetic field 15 about rotational axis 16. One aspect of the present invention is that for a selected rotational axis of magnetic field 15 that intersects center line 15a, angular orientation angle θ uniformly changes along one radial arc originating from the selected rotational axis for each degree of synchronized rotation of magnetic field 15 about the selected rotational axis over approximately an ±eighty (80) degree range of synchronized rotation of magnetic field 15. For example, angular orientation angle θ uniformly changes along a radial arc 18 originating from rotational axis 16 for each degree of synchronized rotation of magnetic field 15 about rotational axis 16 over approximately an ±eighty (80) degree range of synchronized rotation of magnetic field 15 relative to magnetic flux sensor 14. Thus, it is preferred that magnetic flux sensor is initially disposed within magnetic field 15 along center line 15a of magnetic field 15 with planes 14a and 14b parallel to magnetic field 15 and center point 17 of magnetic flux sensor 14 being an intersection point of center line 15a of magnetic field 15 and radial arc 18.

Referring still to FIGS. 2A–2C, several important points must be appreciated and understood. First, the present invention contemplates that the rotational axis of control shaft 20 may or may not coincide with a selected rotational axis of a generated and enclosed magnetic field. Preferably, the rotational axis of control shaft 20 does coincide with the selected rotational axis of the magnetic field, e.g. longitudinal axis 21 of shaft 20 coinciding with rotational axis 16 of magnetic field 15. Second, the relative dimensions of an inner diameter surface of a loop pole piece in accordance with the present invention and a north pole surface and a south pole surface of a magnet in accordance with the present invention defines the maximum synchronous range of rotation of a generated and enclosed magnetic field relative to a magnetic flux sensor. For example, inner diameter surface 11a of loop pole piece 11, and poles surfaces 12a and 12b enable magnetic field 15 to be rotated at least 180 degrees relative to magnetic flux sensor 14. Finally, the symmetrical configurations of a loop pole piece and a magnet void of magnetic flux density "hot spots" along both pole surfaces relative to a center line of a generated and enclosed magnetic field equally balances the magnetic field throughout the air gap area. For example, the symmetrical configurations of loop pole piece 11 and magnet 12 relative to center line 15a of magnetic field 15 equally balances magnetic field 15 throughout air gap area 11c.

Figure 3A:
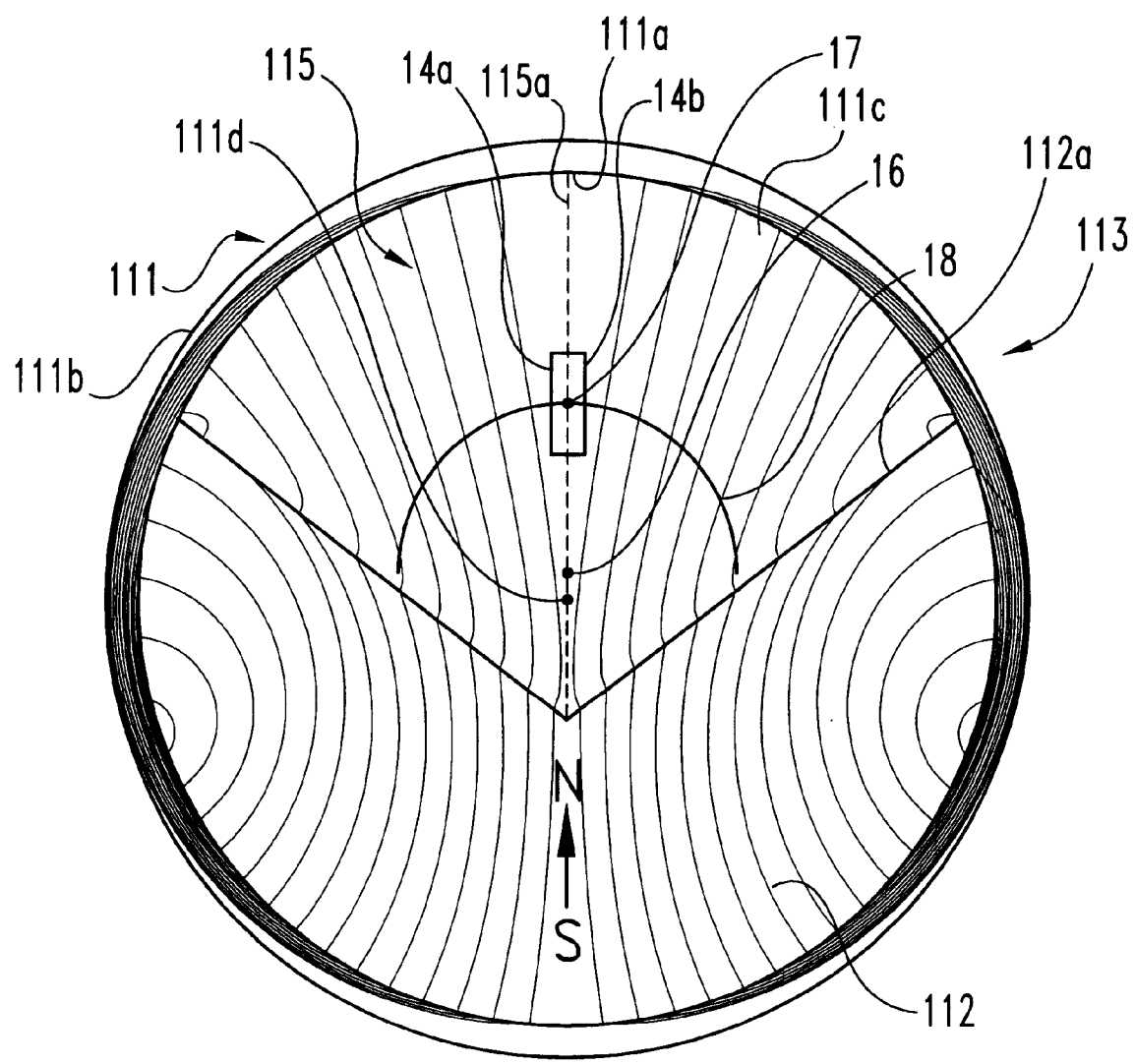
FIG. 3A is a diagrammatic illustration of a second embodiment of a magnetic circuit in accordance with the present invention.
Figure 3B:
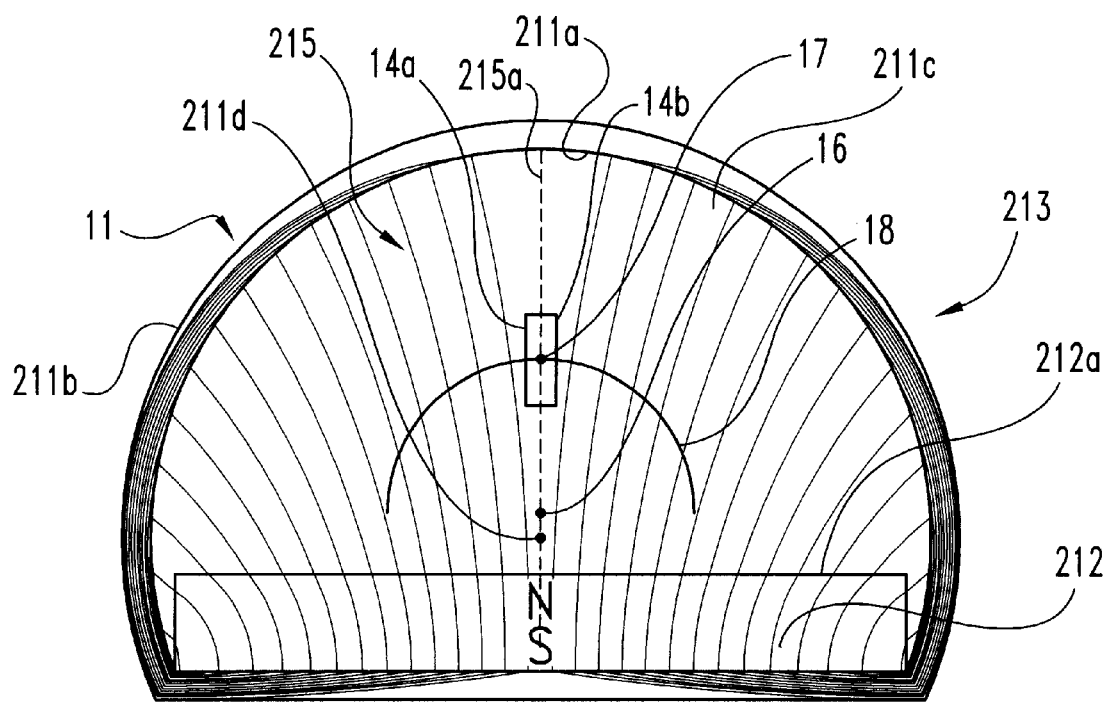
FIG. 3B is a diagrammatic illustration of a third embodiment of a magnetic circuit accordance with the present invention.
Figure 3C:
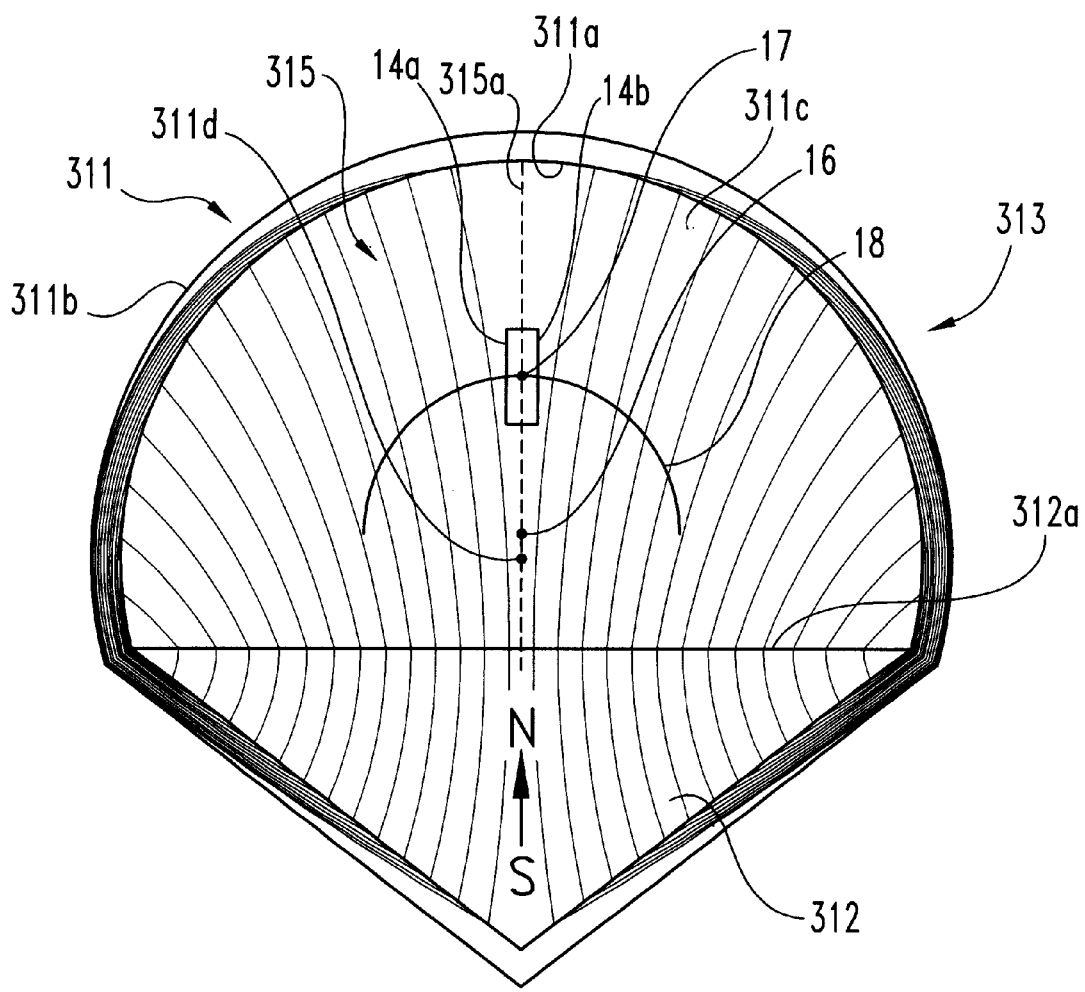
FIG. 3C is a diagrammatic illustration of a fourth embodiment of a magnetic circuit in accordance with the present invention.

Referring to FIGS. 3A–3C, some examples of other magnetic circuits in accordance with the present invention having symmetrical configurations of a loop pole piece and of a magnet void of magnetic flux density "hot spots" along both pole surfaces relative to a centerline of a magnetic field are shown. Referring to FIG. 3A, a second embodiment of a magnetic circuit 113 includes a loop pole piece 111 having an annular configuration and a magnet 112 having a three quarter configuration. Loop pole piece 111 has an annular inner diameter surface 111a defining an air gap area 111c. Magnet 112 is disposed within air gap area 111c and has a north pole surface 112a facing and spaced from inner diameter surface 111a and a south pole surface 112b adjoined to inner diameter surface 111a to generate and enclose an equally balanced magnetic field 115 throughout air gap area 111c. Magnetic circuit 113 is advantageous to provide a more concentrated magnetic field 115 in situations where the definable range of rotation of control shaft 20 is to be thirty (30) degrees. Referring to FIG. 3B, a third embodiment of a magnetic circuit 213 includes a loop pole piece 211 having a dome configuration and a magnet 212 having a rectangular prism configuration. Loop pole piece 211 has an inner diameter surface 211a defining an air gap area 211c. Magnet 212 is disposed within air gap area 211c and has a north pole surface 212a facing and spaced from inner diameter surface 211a and a south pole surface 212b adjoined to inner diameter surface 211a to generate and enclose an equally balanced magnet field 215 throughout air gap area 211c. Magnetic circuit 213 is advantageous in situations where the simplicity of manufacturing a magnet or the expense in purchasing a magnet is of primary importance. Referring to FIG. 3C, a fourth embodiment of a magnetic circuit 313 includes a loop pole piece 311 having a diamond configuration and a magnet 312 having a triangular prism configuration. Loop pole piece 311 has an inner diameter surface 311a defining an air gap area 311c. Magnet 312 is disposed within air gap area 311c and has a north pole surface 312a facing and spaced from inner diameter surface 311a and a south pole surface 312b adjoined to inner diameter surface 311a to generate and enclose an equally balanced magnet field 315 throughout air gap area 311c.

As previously described in FIGS. 1A–1D and accompanying text, a current drive signal $I_{DS}$ and a voltage drive signal $V_{DS}$ need to be supplied to Hall effect device 14 to generate voltage sensing signals $V_{SS1}$, and $V_{SS2}$. The present invention contemplates that any power source supplying current drive signal $I_{DS}$ and voltage drive signal $V_{DS}$ to hall effect device 14 via input lead 14a may be exposed to adverse temperatures as low as −40° Celsius to as high as 150° Celsius when Hall effect device 14 is located in a engine compartment of a motor vehicle, and consequently, it is to be appreciated and understood that current drive signal $I_{DS}$ and voltage drive signal $V_{DS}$ can significantly fluctuate under such adverse temperature conditions. Accordingly, a preferred embodiment of a drive circuit 30 to invariably generate a constant current drive signal $I_{CDS}$ and a constant voltage drive signal $V_{CDS}$ over such adverse temperatures is shown in FIG. 4A.

Figure 4A:
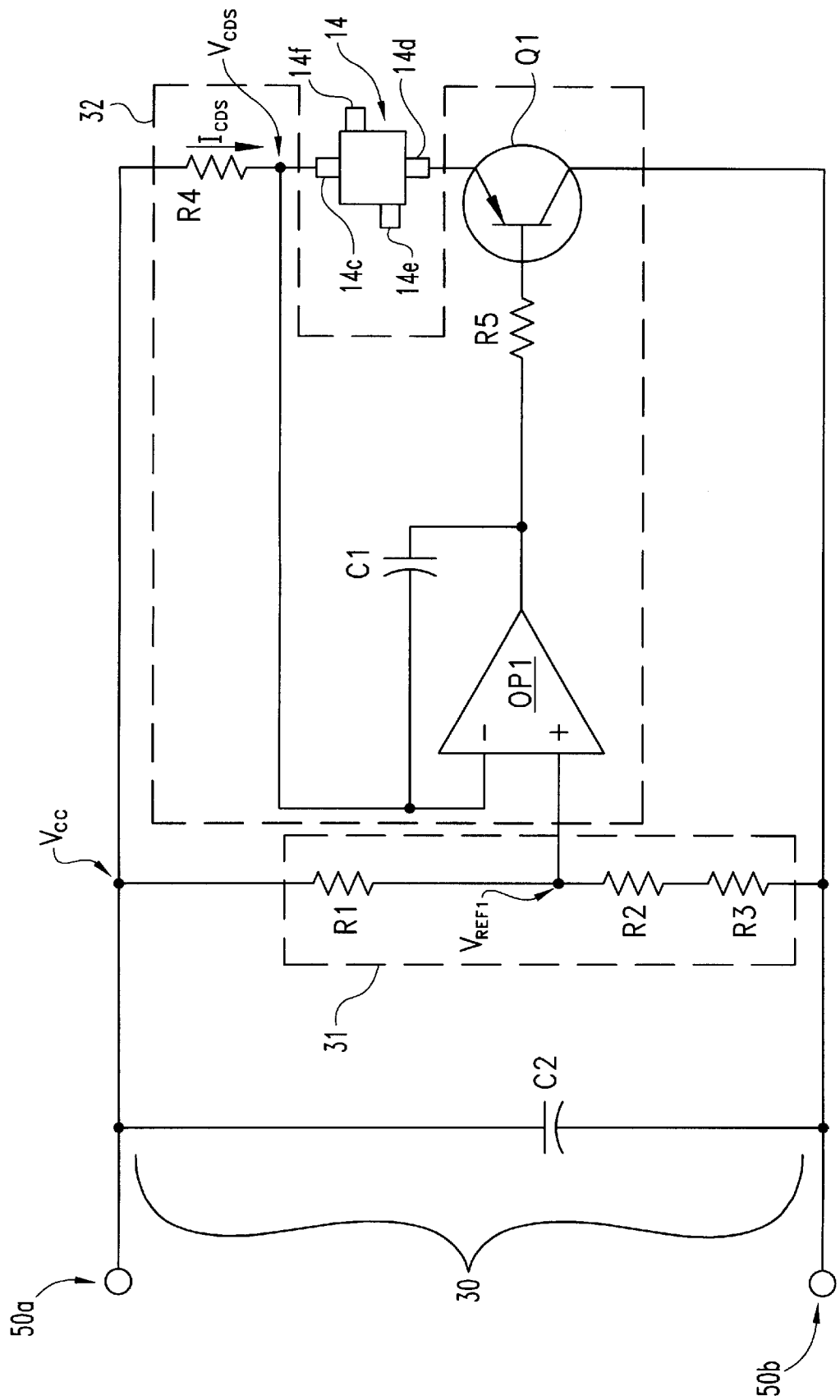
FIG. 4A is a schematic of a preferred embodiment of a drive circuit in accordance with the present invention.

Referring to FIG. 4A, drive circuit 30 comprises a voltage divider 31 operable to generate a first reference voltage signal $V_{REF1}$ in response to a power signal $V_{CC}$. Voltage divider 31 including a first resistor R1, a second resistor R2 and a third resistor R3 electrically coupled in series to a power supply terminal 50a and a ground reference terminal 50b of a power source (not shown). Preferably, the power source transmits a power signal $V_{CC}$ of 5.0 volts and first reference voltage signal $V_{REF1}$ is approximately 2.5 volts. The present invention contemplates that resistors R1 and R2 are of equal value and that resistor R3 is of a significantly less value. Preferably, resistors R1 and R2 are 10 kohm resistors, and resistor R3 is a trimable 1 kohm resistor.

Drive circuit 30 further comprises a current amplifier 32 operable to generate and control constant current drive signal $I_{CDS}$ and constant voltage drive signal $V_{CDS}$ in response to power signal $V_{CC}$ and a generated first reference voltage signal $V_{REF1}$. Current amplifier 32 includes a first operational amplifier OP1, a first bipolar pnp transistor Q1, a fourth resistor R4, a fifth resistor R5, and a first capacitor C1. Operational amplifier OP1 has a non-inverting input electrically coupled to voltage divider 31 to receive a generated reference voltage signal $V_{REF1}$, and an inverting input electrically coupled to input lead 14c of Hall effect device 14. Transistor Q1 has an emitter lead electrically coupled to reference lead 14d of hall effect device 14 and a collector lead electrically coupled to ground reference terminal 50b. Resistor R4 electrically couples power supply terminal 50a to input lead 14c of Hall effect device 14, resistor R5 electrically couples a power output of operational amplifier OP1 to a base lead of transistor Q1, and capacitor C1 electrically couples the power output of operational amplifier OP1 to the inverting input of operational amplifier OP1. Preferably, constant current drive signal $I_{CDS}$ is 7.0 milliamperes±10 microamperes and constant voltage drive signal $V_{CDS}$ is approximately 4.2 volts. Accordingly, it is preferred that resistor R4 is a 150 ohm resistor, resistor R5 is a 470 ohm resistor, and capacitor C1 is a 0.01 microfarads capacitor. The present invention further contemplates that drive circuit 30 can further comprise a second capacitor C2 electrically coupling power supply terminal 50a and ground reference terminal 50b to eliminate any noise from power signal $V_{CC}$. Preferably, capacitor C2 is a 0.1 microfarads capacitor.

Figure 4B:
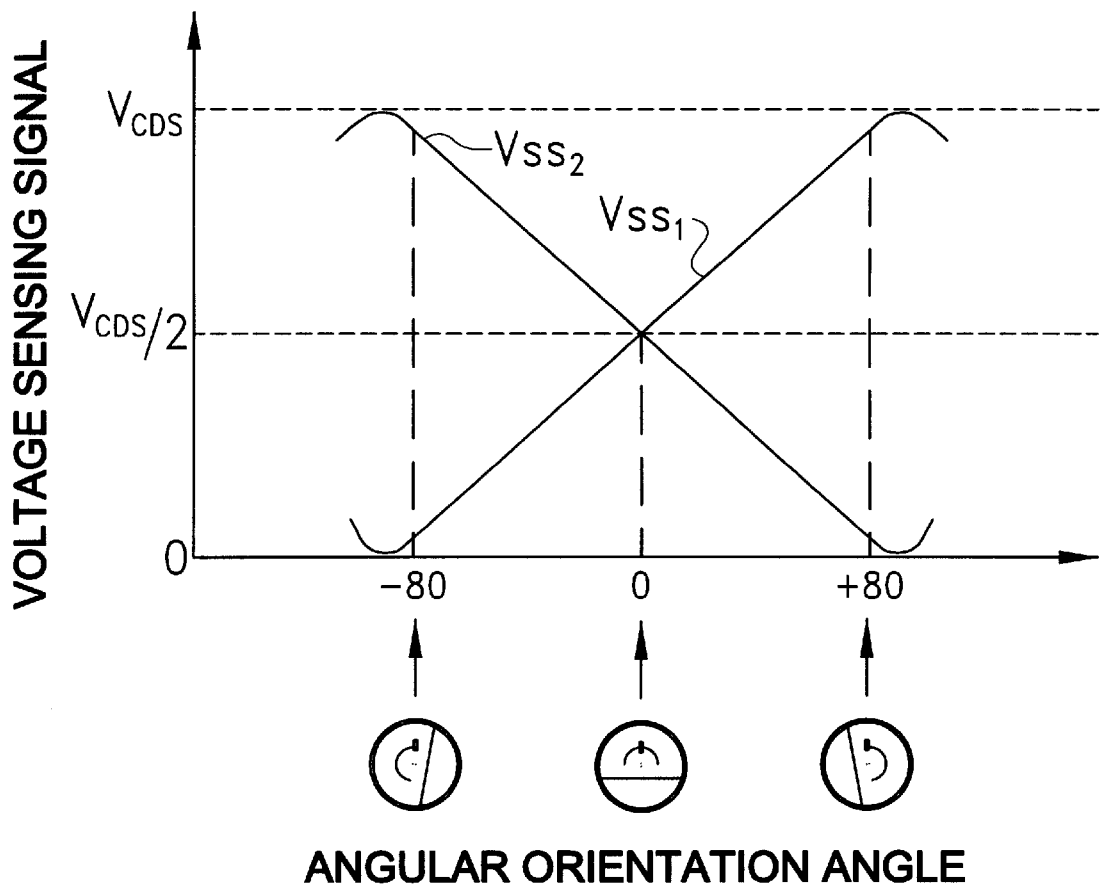
FIG. 4B is a graph depicting a waveform of a first generated voltage sensing signal and a waveform of a second generated voltage sensing signal of a preferred embodiment of the magnetic flux sensor of FIGS. 1A–1D.

Upon receipt of a generated constant current drive signal $I_{CDS}$ and a generated constant voltage drive signal $V_{CDS}$, via input lead 14c, Hall effect device 14 generates voltage sensing signals $V_{SS1}$ and $V_{SS2}$. Waveforms of generated voltage sensing signals $V_{SS1}$ and $V_{SS2}$ as related to angular orientation angle θ Hall effect device 14 relative to magnetic field 15 are shown in FIG. 4B. Referring to FIGS. 2A–2C and 4B, it is to be appreciated and understood that each value of voltage sensing signals $V_{SS1}$ and $V_{SS2}$ along the waveforms exclusively corresponds to a distinct degree of rotation of control shaft 20 about a rotational axis, e.g. longitudinal axis 21 of control shaft 20, over a 180 degree range of rotation. It is to be further appreciated and understood that voltage sensing signals $V_{SS1}$ and $V_{SS2}$ are linearly generated over a middle 160 degrees of the 180 degree range of rotation. Unfortunately, voltage sensing signals $V_{SS1}$ and $V_{SS2}$ are high impedance loads that are not feasible as voltage output signals. Accordingly, a preferred embodiment of an output signal amplifier 40 is shown in FIG. 5.

Figure 5:
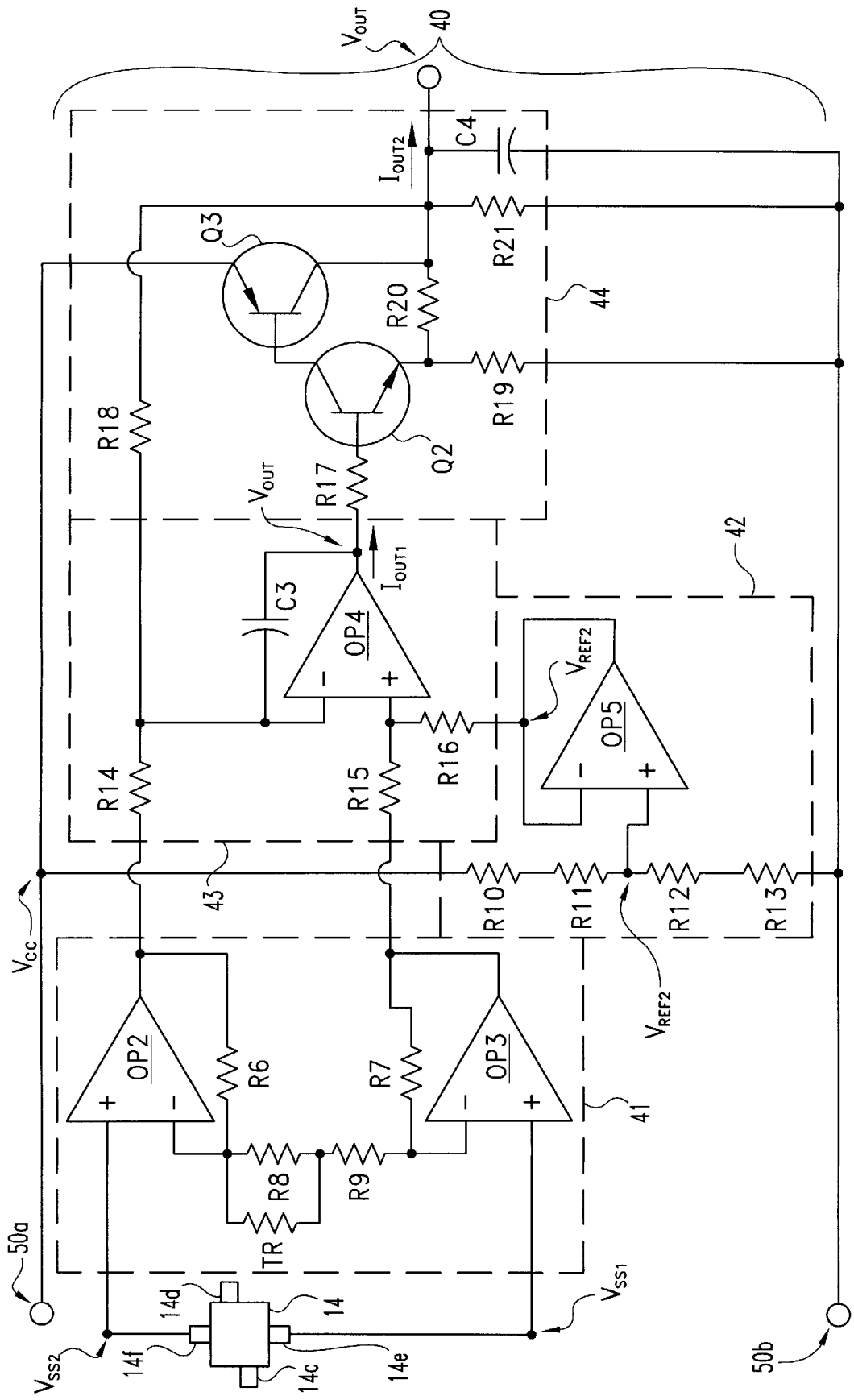
FIG. 5 is a schematic of a preferred embodiment of an output signal amplifier in accordance with the present invention.

Referring to FIG. 5, output signal amplifier 40 comprises a buffer amplifier 41 operable to buffer voltage sensing signals $V_{SS1\ and\ VSS2}$ and to counteract any temperature drift of voltage sensing signals $V_{SS1}$ and/or $V_{SS2}$ due to the ambient temperature of Hall effect device 14. Buffer amplifier 41 includes a second operational amplifier OP2, a third operational amplifier OP3, a sixth resistor R6, a seventh resistor R7, an eighth resistor R8, a ninth resistor R9 and a thermistor TR. Operational amplifier OP2 has a non-inverting input electrically coupled to output lead 14f of Hall effect device 14 to receive a generated voltage sensing signal $V_{SS1}$, and operational amplifier OP3 has a non-inverting input electrically coupled to output lead 14e of Hall effect device 14 to receive a generated voltage sensing signal $V_{SS2}$. Resistor R6 electrically couples a power output of operational amplifier OP2 to an inverting input of operational amplifier OP2, resistor R7 electrically couples a power output of operational amplifier OP3 to an inverting input of operational amplifier OP3, resistors R8 and R9 in series electrically couple the inverting input of operational amplifier OP2 and the inverting input of operational amplifier OP3, and thermistor TR is electrically coupled in parallel to resistor R8. Preferably, resistors R6 and R7 are 10 kohm resistors, and resistors R8 and R9 are 1 kohm resistors.

Output signal amplifier 40 further comprises a voltage divider 42 operable to generate a second reference voltage signal $V_{REF2}$ in response to a power signal $V_{CC}$. Second reference voltage signal $V_{REF2}$ is generated to correct for any manufacturing anomalies of Hall effect device 14 as further described in FIG. 6A and accompanying text. Voltage divider 42 includes a tenth resistor R10, an eleventh resistor R11, a twelfth resistor R12, and a thirteenth resistor R13 electrically coupled in series to power supply terminal 50a and ground reference terminal 50b. Preferably, power signal $V_{CC}$ is 5.0 volts and second reference voltage signal $V_{REF2}$ is approximately 2.5 volts. The present invention contemplates that resistors R10 and R13 are of equal value and that resistors R11 and R12 are of a significantly less value. Preferably, resistors R10 and R13 are 10 kohm resistors, and resistors R11 and R12 are trimable 1 kohm resistors. Voltage divider 42 further includes an operational amplifier OP5 having an non-inverting input electrically coupled to resistors R11 and R12 to receive a generated second reference voltage signal $V_{REF2}$, and an inverting input electrically coupled to a power output.

Output signal amplifier 40 further comprises a differential amplifier 43 operable to generate a voltage output signal $V_{OUT}$ and a first current output signal $I_{OUT1}$ in response to buffered voltage sensing signals $V_{SS1}$ and $V_{SS2}$, and a generated second reference voltage signal $V_{REF2}$. Differential amplifier 43 includes an operational amplifier OP4, a fourteenth resistor R14, a fifteenth resistor R15, a sixteenth resistor R16 and a third capacitor C3. Resistor R14 electrically couples the power output of operational amplifier OP2 to an inverting input of operational amplifier OP4, resistor R15 electrically couples the power output of operational amplifier OP3 to a non-inverting input of operational amplifier OP4, resistor R16 electrically couples the power output of operational amplifier OP5 to the non-inverting input of operational amplifier OP4, and capacitor C3 electrically couples a power output of operational amplifier OP4 to the inverting input of operational amplifier OP4. It is to be appreciated that voltage output signal $V_{OUT}$ is representative of each degree of rotation of a control shaft 20 about the first rotational axis. Preferably, voltage output signal $V_{OUT}$ ranges between 0 volts and 5.0 volts over the 180 degree range of rotation of control shaft 20, and linearly ranges between 0.5 volts and 4.5 volts over a middle 160 degrees of the 180 degree range of rotation. Accordingly, it is preferred that resistors R14, R15 and R16 are 10 kohm resistors, and capacitor C3 is a 0.01 microfarads capacitor.

The present invention contemplates that output signal amplifier 40 can further comprises a boost circuit 44 to transmit voltage output signal $V_{OUT}$ and to boost output current signal $I_{OUT1}$. Boost circuit 44 includes a first bipolar npn transistor Q2, a second bipolar pnp transistor Q3, a seventeenth resistor R17, an eighteenth resistor R18, a nineteenth resistor R19, a twentieth resistor R20, a twenty-first resistor R21, and a fourth capacitor C4. An emitter lead of transistor Q3 is electrically coupled to power supply terminal 50a, and a base lead of transistor Q3 is electrically coupled to a collector lead of transistor Q2. Resistor R17 electrically couples the power output of operational amplifier OP4 to a base lead of transistor Q2, resistor R18 electrically couples the inverting input of operational amplifier OP4 to a collector lead of transistor Q3, resistor R19 electrically couples an emitter lead of transistor Q2 to ground reference terminal 50b, resistor R20 electrically couples the emitter lead of transistor Q2 to the collector lead of transistor Q3, and resistor 21 and capacitor C4 electrically couple the collector lead of transistor Q3 to ground reference terminal 50b. Preferably, a boosted output current signal $I_{OUT2}$ is approximately 5 milliamperes. Accordingly, it is preferred that resistor R17 and R19 are 5.6 kohm resistors, resistor R18 is a 10 kohm resistor, R20 is a 8.2 kohm resistor, R21 is a trimable 1 kohm resistor and capacitor C4 is a 0.1 microfarads capacitor.

Figure 6A:
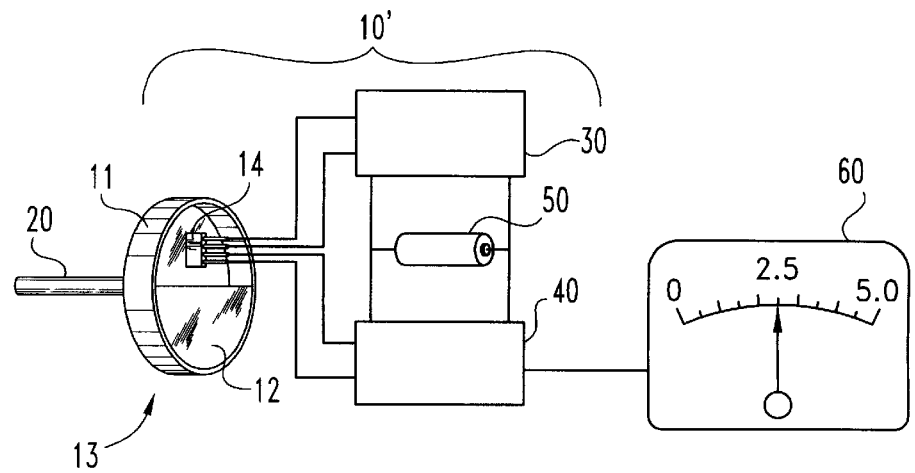
FIG. 6A is a diagrammatic illustration of a reference positioning of a magnetic flux sensor of a preferred embodiment of a magnetic rotational position sensor in accordance with the present invention as adjoined to a control shaft.
Figure 6B:
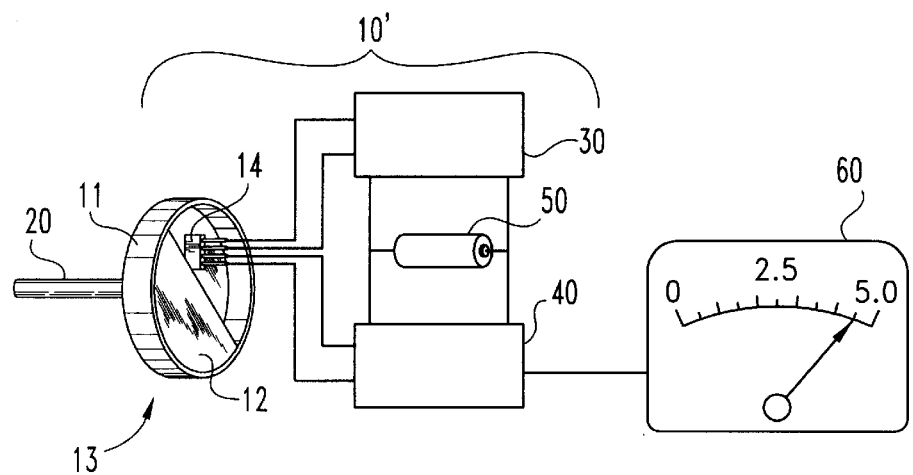
FIG. 6B is a diagrammatic illustration of a clockwise synchronous rotation of a magnetic circuit of the magnetic rotational position sensor of FIG. 6A.
Figure 6C:
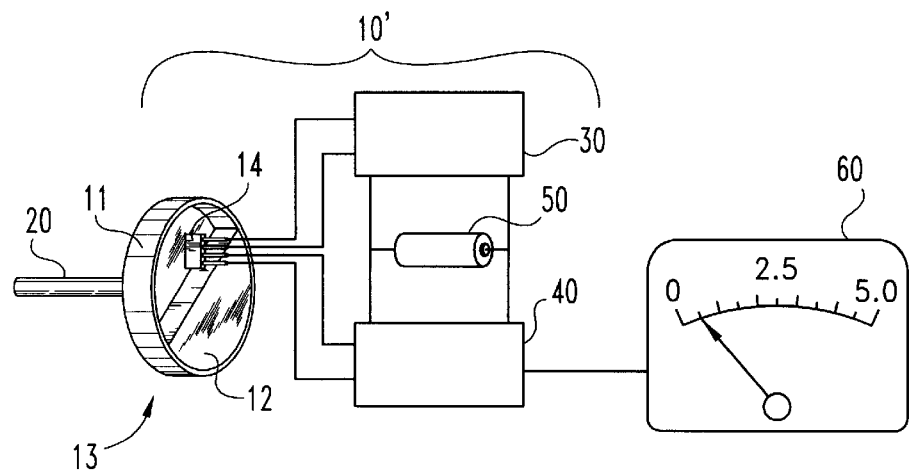
FIG. 6C is a diagrammatic illustration of a counterclockwise synchronous rotation of the magnetic circuit of the magnetic rotational position sensor of FIG. 6A.

Referring to FIGS. 6A–6D, a preferred embodiment of a magnetic rotational position sensor 10' in accordance with the present invention is shown. Magnetic rotational position sensor 10' comprises magnetic circuit 13, Hall effect device 14, drive circuit 30 and output signal amplifier 40 as previously described herein. Magnetic rotational position sensor 10' further comprises a power source 50, e.g. a battery as shown, electrically coupled to drive circuit 30 and output signal amplifier 40 to supply a power signal of 5.0 volts to drive circuit 30 and output signal amplifier 40. The present invention contemplates that at an angular orientation angle θ of zero degrees, voltage sensing signals $V_{SS1\ and\ VSS2}$ should be 2.5 volts and output voltage signal $V_{OUT}$ should be 2.5 volts as indicated on a voltmeter 60 as shown in FIG. 6A. It is to be appreciated and understood that Hall effect device 14 can have manufacturing anomalies that offsets voltage sensing signals $V_{SS1\ and\ VSS2}$ and output voltage signal $V_{OUT}$ from 2.5 volts. Thus, resistor R3 of drive circuit 30, and resistors R11 and R12 of output signal amplifier 40 are trimmed as necessary to transform the values of voltage sensing signals $V_{SS1}$ and $V_{SS2}$ and output voltage signal $V_{OUT}$ to 2.5 volts. It is to be further appreciated and understood that thermistor TR of output signal amplifier 40 will maintain the value of output voltage signal $V_{OUT}$ to 2.5 volts over a temperature range of approximately −40° Celsius and 150° Celsius. As a result, at an angular orientation angle θ of +eighty (80) degrees, voltage sensing signals $V_{S1}$ is 4.5 volts and $V_{S2}$ is 0.5 volts, and output voltage signal $V_{OUT}$ is 4.5 volts as indicated on voltmeter 60 as shown in FIG. 6B, and at an angular orientation angle θ of −eighty (80) degrees, voltage sensing signals $V_{S1}$ is 0.5 volts and $V_{S2}$ is 4.5 volts, and output voltage signal $V_{OUT}$ is 0.5 volts as indicated on voltmeter 60 as shown in FIG. 6C. It is to be appreciated and understood that output voltage signal $V_{OUT}$ varies linearly between 0.5 volts and 4.5 volts, and increases and decreases at a rate of 0.025 volts per full degree of rotation of control shaft 20. As a result, output voltage signal $V_{OUT}$ can be easily processed by a microprocessor based system to control all rotational movements of control shaft 20 about the first rotational axis.

Figure 7:
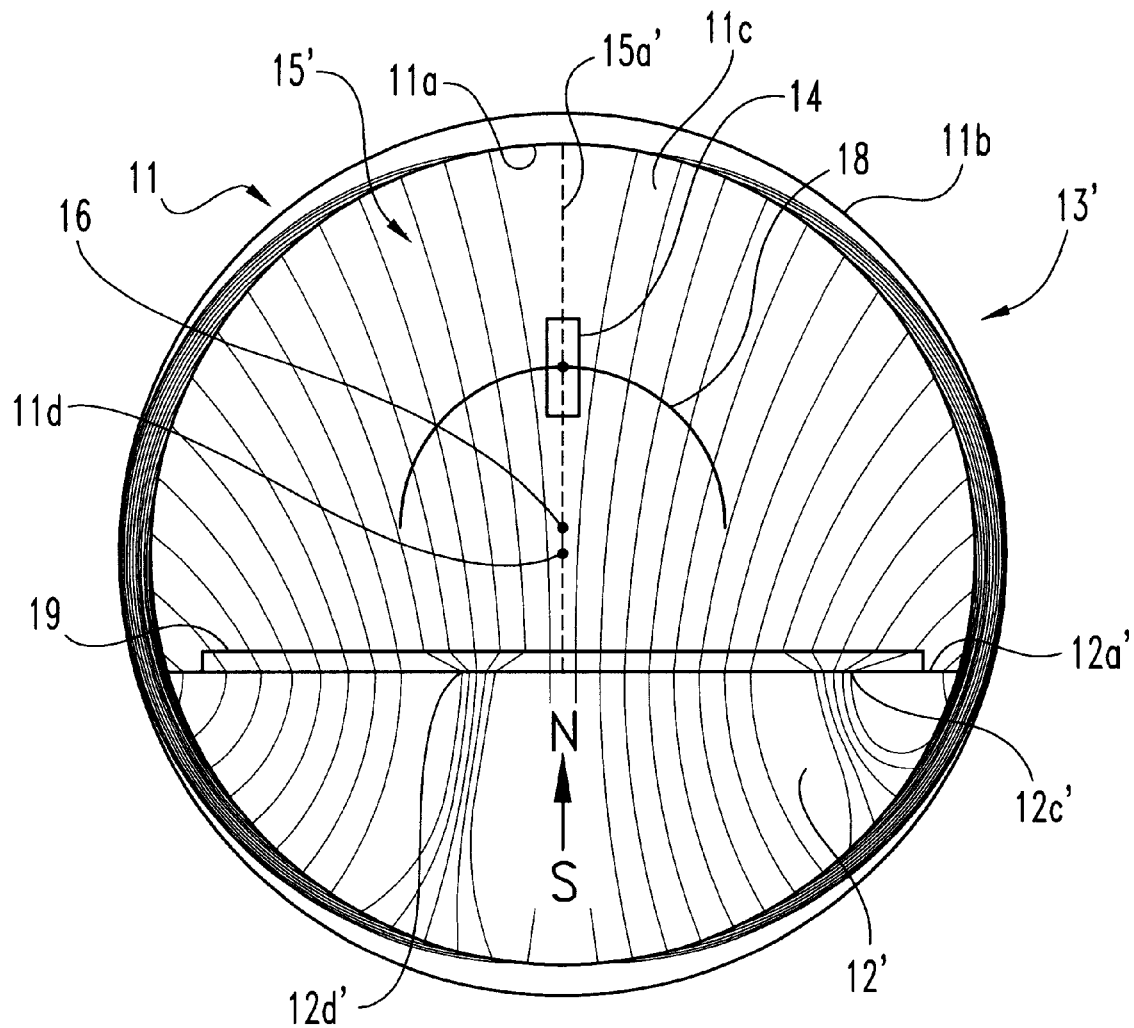
FIG. 7 is a diagrammatic illustration of an alternative embodiment of the magnet circuit of FIGS. 2A–2C in accordance with the present invention.

As previously described herein in reference to FIGS. 1A–1D and accompanying text, magnetic circuit 13 includes an injection molded rare earth magnet 12 having a substantially semi-circular configuration that is void of any magnetic flux density "hot spots" along both pole surfaces 12a and 12b. Typically, such magnets are difficult to manufacture. Accordingly, an alternative embodiment of a magnetic circuit 13' in accordance with the present invention is shown in FIG. 7. Referring to FIG. 7, magnetic circuit 13' includes loop pole piece 11 and a magnet 12' of a semi-circular configuration having a first magnetic flux density hot spot 12c' and a second magnetic flux density hot spot 12d' on a north pole surface 12a'. It is to be appreciated and understood that hot spots 12c' and 12d' hinders an equally balanced magnetic field throughout air gap area 11c. Thus, magnetic circuit 13' further includes a diffusion plate 19 adjacent north pole surface 12a' of magnet 12' to create and maintain an equally balance magnetic field 15' throughout air gap area 11c.

Figure 8:
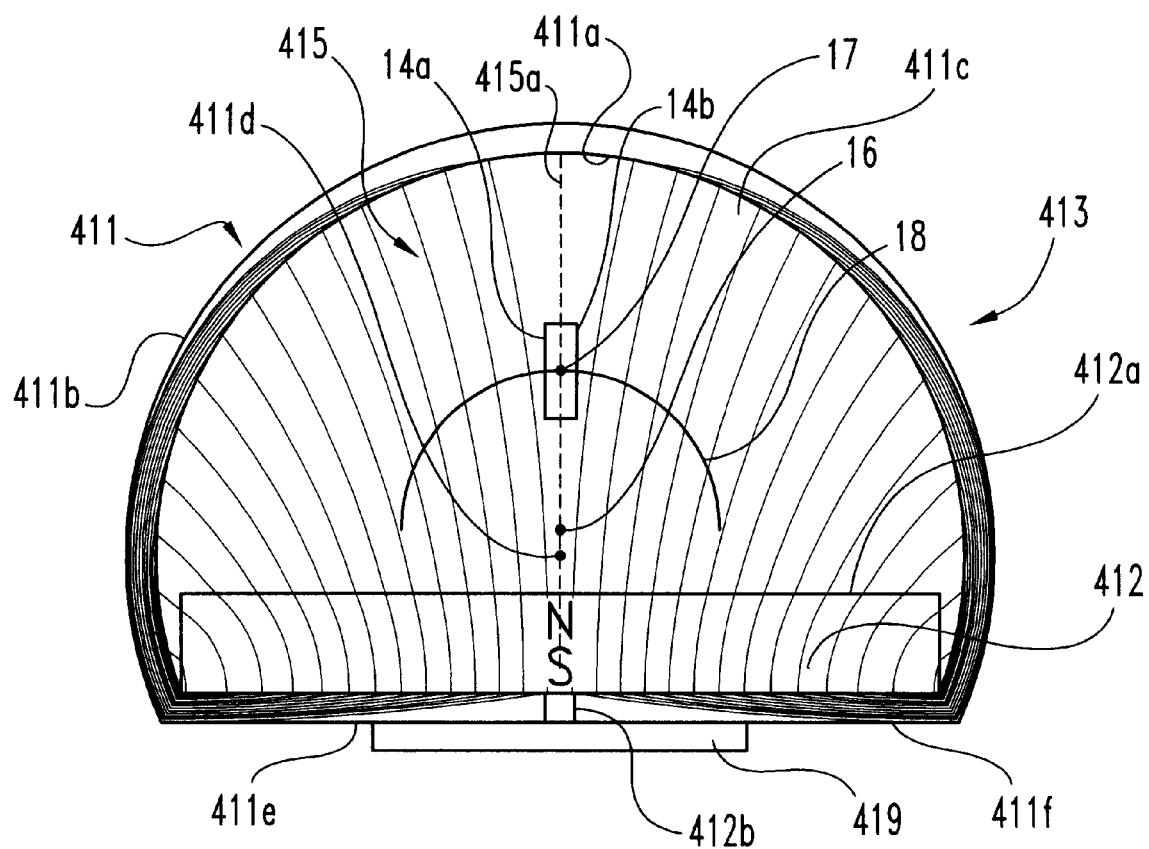
FIG. 8 is a diagrammatic illustration of an alternative embodiment of the magnet circuit of FIG. 3A in accordance with the present invention.

As defined herein in reference to FIGS. 1A–1D and accompanying text, a loop pole piece can be any combination of manufactured magnetizable articles that has a closed configuration defining an air gap area. FIG. 8 is an example of such a loop pole piece. Referring to FIG. 8, a magnetic circuit 413 includes a first pole piece 411 of an opened dome configuration, and a second pole piece 419 having a rectangular prism configuration adjoined to a portions 411e and 411f of pole piece 411 to close first pole piece 411, thus defining an air gap area 411c. Magnetic circuit 413 further includes a magnet 412 disposed within air gap area 411c with a north pole surface 412a facing and spaced from an inner diameter surface 411a of pole piece 411 and a south pole surface adjoined to a portion 411e and a portion 411f of pole piece 411 to generate a magnetic field 415. Pole piece 419 is properly aligned along portions 411e and 411f to equally balance enclosed magnetic field 415 throughout air gap area 411c.

While the present invention has been illustrated and described in detail in the drawings and foregoing description, the same is to be considered as illustrative and not restrictive in character, it being understood that the preferred embodiment has been shown and described and that all changes and modifications that come within the spirit of the invention are desired to be protected.

What is claimed is:

1. A magnetic rotational position sensor for sensing each degree of rotation of a control shaft about a first rotational axis of the control shaft over a definable range of rotation, said magnetic rotational position sensor comprising:

a loop pole piece having an inner diameter surface defining an air gap area;

a magnet disposed in said air gap area, said magnet having a first pole surface facing and spaced from said inner diameter surface and a second pole surface facing said inner diameter surface to generate a magnetic field within said air gap area and to enclose said magnetic field within said loop pole piece, wherein said loop pole piece is adjoined to the control shaft to synchronously rotate said magnetic field about a second rotational axis for each degree of rotation of the control shaft about the first rotational axis whereby each degree of rotation of the control shaft about the first rotational axis exclusively corresponds to a distinct degree of synchronized rotation of said magnetic field about said second rotational axis; and a magnetic flux sensor operable to sense a magnitude of magnetic flux density passing through said magnetic flux sensor, wherein said magnetic flux sensor is disposed within said magnetic field to sense a different magnitude of magnetic flux density passing through said magnetic flux sensor for each degree of synchronous rotation of said magnetic field over the definable range of rotation.

2. The magnetic rotational position sensor of claim 1 wherein said first pole surface of said magnet is a north pole surface, and said second pole surface of said magnet is a south pole surface.

3. The magnetic rotational position sensor of claim 1 wherein said first pole surface of said magnet is a south pole surface, and said second pole surface of said magnet is a north pole surface.

4. The magnetic rotational position sensor of claim 1 wherein said second pole surface of said magnet is spaced from said inner diameter surface of said loop pole piece.

5. The magnetic rotational position sensor of claim 1 wherein said second pole surface of said magnet is adjacent said inner diameter surface of said loop pole piece.

6. The magnetic rotational position sensor of claim 1 wherein said second pole surface of said magnet is adjoined to said inner diameter surface of said loop pole piece.

7. The magnetic rotational position sensor of claim 1 wherein said magnetic flux sensor is a Hall effect device.

8. The magnetic rotational position sensor of claim 1 wherein said second rotational axis coincides with the first rotational axis.

9. The magnetic rotational position sensor of claim 1 wherein said second rotational axis is separate from the first rotation al axis.

10. The magnetic rotational position sensor of claim 1 where in a configuration of said loop pole piece and a configuration of said magnet are symmetrical relative to a center line of said magnetic field.

11. The magnetic rotational position sensor of claim 1 wherein a configuration of said loop pole piece and a configuration of said magnet are asymmetrical relative to a center line of said magnetic field.

12. The magnetic rotational position sensor of claim 1 wherein said magnet is void of any magnetic flux density hot spots along said first pole surface.

13. The magnetic rotational position sensor of claim 1 wherein said magnet includes at least one magnetic flux density hot spot along said first pole surface.

14. The magnetic rotational position sensor of claim 13 further comprising a diffusion plate adjacent said first pole surface to equally balance said magnetic field throughout said air gap area.

15. The magnetic rotational position sensor of claim 1 wherein said loop pole piece includes a first pole piece having a closed configuration defining said air gap area.

16. The magnetic rotational position sensor of claim 1 wherein said loop pole piece includes a first pole piece having an opened configuration and a second pole piece adjoined to said first pole piece to close said opened configuration of said first pole piece to thereby define said air gap area.

17. A magnetic rotational position sensor for generating at least one voltage sensing signal representative of a sensing of each degree of rotation of a control shaft about a first rotational axis of the control shaft over a definable range of rotation, said magnetic rotational position sensor comprising:
   a magnetic circuit including
      a loop pole piece having an inner diameter surface defining an air gap area, and
      a magnet disposed in said air gap area to generate a magnetic field within said air gap area and to enclose said magnetic field within said loop pole piece,
         wherein said magnetic circuit is adjoined to the control shaft to synchronously rotate said magnetic field about a second rotational axis for each degree of rotation of the control shaft about the first rotational axis whereby each degree of rotation of the control shaft about the first rotational axis exclusively corresponds to a distinct degree of synchronized rotation of said magnetic field about said second rotational axis;
   a drive circuit including means for generating a constant current drive signal and a constant voltage drive signal; and
   a magnetic flux sensor electrically coupled to said drive circuit to receive a generated constant current drive signal and a generated constant voltage drive signal, said magnetic flux sensor operable to generate a first voltage sensing signal representative of a sensing of a magnitude of magnetic flux density passing through said magnetic flux sensor in response to said generated constant current drive signal and said generated constant voltage drive signal,
      wherein said magnetic flux sensor is disposed within said magnetic field to sense a different magnitude of magnetic flux density passing through said magnetic flux sensor for each degree of synchronous rotation of said magnetic field over the definable range of rotation whereby a generated first voltage sensing signal is also representative of each degree of rotation of the control shaft about the first rotational axis of the control shaft over the definable range of rotation.

18. The magnetic rotational position sensor of claim 17 wherein
   said magnet has a first pole surface facing and spaced from said inner diameter surface and a second pole surface facing said inner diameter surface to generate said magnetic field within said air gap area and to enclose said magnetic field within said loop pole piece, wherein said loop pole piece is adjoined to the control shaft to synchronously rotate said magnetic field about said second rotational axis for each degree of rotation of the control shaft about the first rotational axis whereby each degree of rotation of the control shaft about the first rotational axis exclusively corresponds to a distinct degree of synchronized rotation of said magnetic field about said second rotational axis.

19. The magnetic rotational position sensor of claim 18 wherein said first pole surface of said magnet is a north pole surface, and said second pole surface of said magnet is a south pole surface.

20. The magnetic rotational position sensor of claim 18 wherein said first pole surface of said magnet is a south pole surface, and said second pole surface of said magnet is a north pole surface.

21. The magnetic rotational position sensor of claim 18 wherein said second pole surface of said magnet is spaced from said inner diameter surface of said loop pole piece.

22. The magnetic rotational position sensor of claim 18 wherein said second pole surface of said magnet is adjacent said inner diameter surface of said loop pole piece.

23. The magnetic rotational position sensor of claim 18 wherein said second pole surface of said magnet is adjoined to said inner diameter surface of said loop pole piece.

24. The magnetic rotational position sensor of claim 17 wherein said magnetic flux sensor is a Hall effect device.

25. The magnetic rotational position sensor of claim 17 wherein said second rotational axis coincides with the first rotational axis.

26. The magnetic rotational position sensor of claim 17 wherein said second rotational axis is separate from the first rotational axis.

27. The magnetic rotational position sensor of claim 17 wherein a configuration of said loop pole piece and a configuration of said magnet are symmetrical relative to a center line of said magnetic field.

28. The magnetic rotational position sensor of claim 17 wherein a configuration of said loop pole piece and a configuration of said magnet are asymmetrical relative to a center line of said magnetic field.

29. The magnetic rotational position sensor of claim 18 wherein said magnet is void of any magnetic flux density hot spots along said first pole surface.

30. The magnetic rotational position sensor of claim 18 wherein said magnet includes at least one magnetic flux density hot spot along said first pole surface.

31. The magnetic rotational position sensor of claim 30 further comprising a diffusion plate adjacent said first pole surface to equally balance said magnetic field throughout said air gap area.

32. The magnetic rotational position sensor of claim 17 wherein said loop pole piece includes a first pole piece having a closed configuration defining said air gap area.

33. The magnetic rotational position sensor of claim 17 wherein said loop pole piece includes a first pole piece having an opened configuration and a second pole piece adjoined to said first pole piece to close said opened configuration of said first pole piece to thereby define said air gap area.

34. A magnetic rotational position sensor for generating a voltage output signal representative of a sensing of each degree of rotation of a control shaft about a first rotational axis of the control shaft over a definable range of rotation, said magnetic rotational position sensor comprising:
   a magnetic circuit including
      a loop pole piece having an inner diameter surface defining an air gap area, and a magnet disposed in said air gap area to generate a magnetic field within said air gap area and to enclose said magnetic field within said loop pole piece,
  wherein said magnetic circuit is adjoined to the control shaft to synchronously rotate said magnetic field about a second rotational axis for each degree of rotation of the control shaft about the first rotational axis whereby each degree of rotation of the control shaft about the first rotational axis exclusively corresponds to a distinct degree of synchronized rotation of said magnetic field about said second rotational axis;
a magnetic flux sensor operable to generate a first sensing voltage signal representative of a sensing of a magnitude of magnetic flux density passing through a first plane of said magnetic flux sensor and a second sensing voltage signal representative of a sensing of a magnitude of magnetic flux density passing through a second plane of said magnetic flux sensor,
  wherein said magnetic flux sensor is disposed within said magnetic field to sense a distinct magnitude of magnetic flux density passing through said first plane and said second plane for each degree of synchronous rotation of said magnetic field over the definable range of rotation whereby a generated first voltage sensing signal and a generated second voltage sensing signal are also representative of each degree of rotation of the control shaft about the first rotational axis of the control shaft over the definable range of rotation; and
an output signal amplifier electrically coupled to said magnetic flux sensor to receive said generated first voltage sensing signal and said generated second voltage sensing signal, said output signal amplifier operable to generate said voltage output signal in response to said generated first voltage signal and said generated second voltage signal, said output signal amplifier including means for counteracting any temperature drift of said generated first voltage sensing signal and any temperature drift of said generated second voltage sensing signal.

35. The magnetic rotational position sensor of claim 34 said magnet has a first pole surface facing and spaced from said inner diameter surface and a second pole surface facing said inner diameter surface to generate said magnetic field within said air gap area and to enclose said magnetic field within said loop pole piece, wherein said loop pole piece is adjoined to the control shaft to synchronously rotate said magnetic field about said second rotational axis for each degree of rotation of the control shaft about the first rotational axis whereby each degree of rotation of the control shaft about the first rotational axis exclusively corresponds to a distinct degree of synchronized rotation of said magnetic field about said second rotational axis.

36. The magnetic rotational position sensor of claim 35 wherein said first pole surface of said magnet is a north pole surface, and said second pole surface of said magnet is a south pole surface.

37. The magnetic rotational position sensor of claim 35 wherein said first pole surface of said magnet is a south pole surface, and said second pole surface of said magnet is a north pole surface.

38. The magnetic rotational position sensor of claim 35 wherein said second pole surface of said magnet is spaced from said inner diameter surface of said loop pole piece.

39. The magnetic rotational position sensor of claim 35 wherein said second pole surface of said magnet is adjacent said inner diameter surface of said loop pole piece.

40. The magnetic rotational position sensor of claim 35 wherein said second pole surface of said magnet is adjoined to said inner diameter surface of said loop pole piece.

41. The magnetic rotational position sensor of claim 34 wherein said magnetic flux sensor is a Hall effect device.

42. The magnetic rotational position sensor of claim 34 wherein said second rotational axis coincides with the first rotational axis.

43. The magnetic rotational position sensor of claim 34 wherein said second rotational axis is separate from the first rotational axis.

44. The magnetic rotational position sensor of claim 34 wherein a configuration of said loop pole piece and a configuration of said magnet are symmetrical relative to a center line of said magnetic field.

45. The magnetic rotational position sensor of claim 34 wherein a configuration of said loop pole piece and a configuration of said magnet are asymmetrical relative to a center line of said magnetic field.

46. The magnetic rotational position sensor of claim 35 wherein said magnet is void of any magnetic flux density hot spots along said first pole surface.

47. The magnetic rotational position sensor of claim 35 wherein said magnet includes at least one magnetic flux density hot spot along said first pole surface.

48. The magnetic rotational position sensor of claim 47 further comprising a diffusion plate adjacent said first pole surface to equally balance said magnetic field throughout said air gap area.

49. The magnetic rotational position sensor of claim 34 wherein said loop pole piece includes a first pole piece having a closed configuration defining said air gap area.

50. The magnetic rotational position sensor of claim 34 wherein said loop pole piece includes a first pole piece having an opened configuration and a second pole piece adjoined to said first pole piece to close said opened configuration of said first pole piece to thereby define said air gap area.

51. The magnetic rotational position sensor of claim 34 wherein said output signal amplifier further includes means for boosting a current output signal associated with said voltage output signal.

* * * * *

UNITED STATES PATENT AND TRADEMARK OFFICE
CERTIFICATE OF CORRECTION

PATENT NO. : 6,137,288
DATED : October 24, 2000
INVENTOR(S) : Robert H. Luetzow

Page 1 of 1

It is certified that error appears in the above-identified patent and that said Letters Patent is hereby corrected as shown below:

Column 5,
Line 44, change "troop" to -- Loop --.

Column 8,
Line 12, change "hall" to -- Hall --.
Line 35, change "10 kohm" to -- 10k ohm --.
Line 36, change "1 kohn" to -- 1k ohm --.
Line 49, change "hall" to -- Hall --.

Column 9,
Line 42, change "10 kohm" to -- 10k ohm --.
Line 43, change "1 kohm" to -- 1k ohm --.
Line 58, change "10 kohm" to -- 10k ohm --.
Line 59, change "1 kohm" to -- 1k ohm --.

Column 10,
Line 22, change "10 kohn" to -- 10k ohm --.
Line 46, change "5.6 kohm" to -- 5.6k ohm --.
Line 47, change "10 kohm" to -- 10k ohm --.
Line 47, change "8.2 kohm" to -- 8.2k ohm --.
Line 48, change "1 kohm" to -- 1k ohm --.

Column 12,
Line 56, after the word "rotation al" should read -- rotational --
Line 58, change "where in" to -- wherein --.

Signed and Sealed this

Twenty-third Day of October, 2001

Attest:

NICHOLAS P. GODICI
Attesting Officer    Acting Director of the United States Patent and Trademark Office